May 31, 1960

F. K. H. NALLINGER ET AL 2,938,407

DIFFERENTIAL TRANSMISSION

Filed July 1, 1958

Inventor
FRIEDRICH K. H. NALLINGER
WERNER E. ALTMANN
BY Dicke and Craig
ATTORNEYS

United States Patent Office 2,938,407
Patented May 31, 1960

2,938,407

DIFFERENTIAL TRANSMISSION

Friedrich K. H. Nallinger and Werner E. Altmann, Stuttgart, Germany, assignors to Daimler-Benz Aktiengesellschaft, Stuttgart-Unterturkheim, Germany Filed July 1, 1958, Ser. No. 746,058

Claims priority, application Germany July 6, 1957

16 Claims. (Cl. 74—650)

Our invention relates to a differential transmission, particularly for motor vehicles, and, more especially, relates to a differential transmission equipped with hydraulic means counteracting excessive relative rotation of the driven members of the transmission, such as the shafts connected to the driven wheels of the motor vehicle.

It is the object of our invention to provide an improved differential transmission of this type in which the hydraulic means counteracting relative rotation of the driven members will be ineffective for low relative speeds but will be highly effective when the relative speed of the driven differential members tends to exceed a certain comparatively low limit.

Furthermore it is an object of our invention to provide a differential transmission of the type indicated which is of a simple, compact and rugged structure which lends itself to manufacture and assembly at a low cost and is subject to a minimum of wear.

Further objects of our invention will appear from a detailed description of a preferred embodiment of the invention following hereinafter with reference to the accompanying drawings. However, we wish it to be clearly understood that our invention is in no way limited to such details and that the terms and phrases in such detailed description have been chosen for the purpose of describing and illustrating the invention rather than that of restricting or limiting same.

Figure 1:
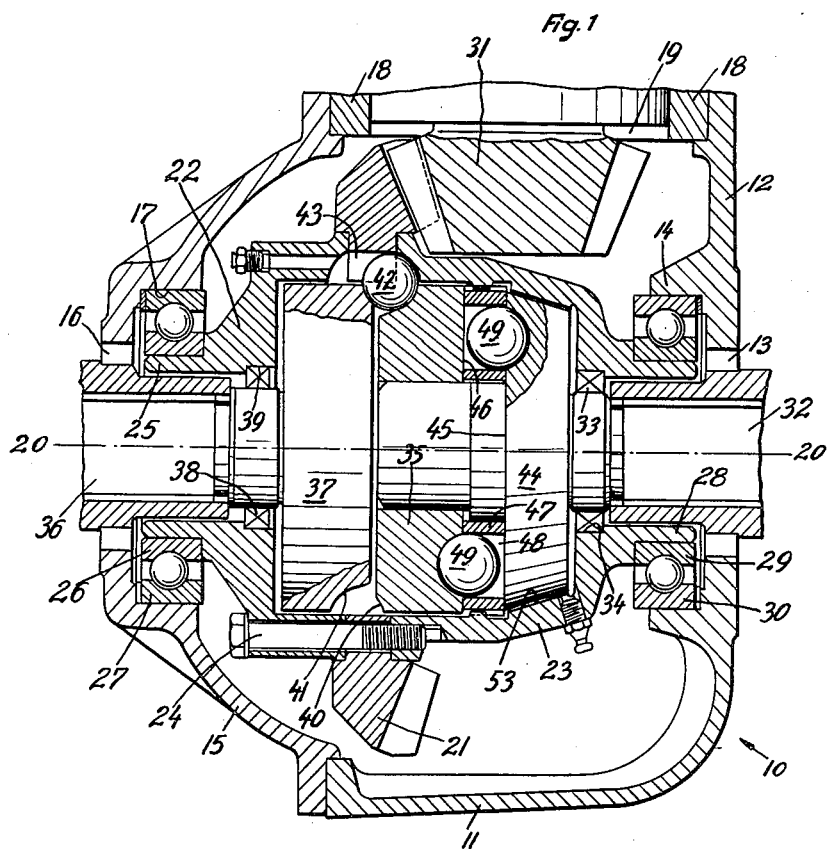
Fig. 1 is a horizontal section taken through our transmission.

The cup-shaped housing 10 has a substantially cylindrical side wall 11 and a substantially plane bottom wall 12 provided with a central opening 13 surrounded by an inner annular rib 14. The cup-shaped housing 10 is closed by a dome-shaped cover 15 having a central aperture 16 surrounded by an internal shoulder 17 which is coaxially disposed with respect to the rib 14. The side wall 11 has an aperture accommodating a bracket member 18 which is held in place by the cover 15 and has a cylindrical bore 19. The axis of the bore 19 intersects the axis 20—20 of the hole 13 at right angles.

The differential transmission encased in the housing 11 comprises one driving member and a pair of driven members and means for mounting such members for relative rotation about the common axis 20—20.

The driving member of the differential transmission is composed of a ring-shaped bevel gear 21 disposed coaxially with axis 20—20 and of coaxial cup-shaped elements 22 and 23 mounted on both sides of the bevel gear 21 and rigidly connected therewith by a plurality of circumferentially distributed bolts 24.

The member 22 is formed with a cylindrical projection 25 carrying the inner race 26 of a ball bearing, whereas the outer race 27 thereof is seated on the shoulder 17 of the cover 15 of the housing 10.

Similarly, the cup-shaped member 23 is formed with a cylindrical projection 28 carrying the inner race 29 of a ball bearing, whereas the outer race 30 thereof is carried by the annular rib 14 of the housing 10. In this manner the driving member 21, 22, 23 is journaled in the housing 10 for rotation about the horizontal axis 20—20. Rotation is imparted to the driving member by a bevel pinion 31 which meshes with the bevel ring gear 21 and is journalled in the bore 19 coaxially therewith by anti-friction bearings not shown carried by the bracket member 18.

One of the driven members of the differential transmission consists of a shaft 32 and an annular disk 35, the shaft 32 extending into the cup-shaped element 23 coaxially therewith and being journalled therein by an anti-friction bearing 33 mounted on an internal seating face 34 of the member 23 and on the shaft 32. The annular disk 35 is rigidly connected to, for instance press-fitted on, the inner end of shaft 32.

The other driven member of the differential transmission consists of a shaft 36 and of an annular disk 37, the shaft 36 extending into the cup-shaped member 22 and being journalled therein by an anti-friction bearing 38 mounted on an internal seating face 39 of the member 22 and on the shaft 36. The annular disk 37 is rigidly connected to, for instance press-fitted on, the inner end of shaft 36.

The annular disks 35 and 37 each forming part of one of the driven members of the differential transmission have cylindrical peripheral faces of equal diameters and opposed plane end faces. The circular edges formed by such end faces with the peripheral faces are chamfered as shown in Fig. 1 at 40 and 41. The chamfers 40 and 41 constitute undulated cam faces similar to those which will be described hereinafter with reference to Fig. 2. These cam faces cooperate with a plurality of spherical followers 42 which are maintained in position for cooperation with the cam faces 40, 41 by a cage formed by the driving member 21. For this purpose, the inner periphery of the annular drive member 21 is provided with channel-shaped recesses 43 having an arc-shaped profile, each recess accommodating the upper portion of one spherical follower 42, whereas the lower portion thereof engages the undulated cam faces 40 and 41.

Relative rotation of the driven members and the consequent relative circumferential displacement of the cam faces 40 and 41 causes the followers 42 to reciprocate in a direction extending parallel to the axis 20—20 between an extreme right-hand position shown in Fig. 1 in which the follower 42 enters the cup-shaped member 23 and an extreme left-hand position in which it enters the cup-shaped member 22. Irrespective of whether or not the driven members of the transmission perform a relative rotation, a driving couple can be transferred in either direction of rotation from the driving member 21 to the followers 42 and by the latter to the driven members of the transmission, as the side faces of the recesses 43 will exert a circumferential force upon the followers 42 and the latter will exert a similar circumferential force upon the slanting portions of the undulated cam faces 40 and 41. In this manner, a driving couple may be transferred from the drive member 21 to the driven shafts 32 and 36 leaving such driven shafts freedom for relative angular displacement in either direction about the axis 20—20.

For the purpose of producing a dash-pot effect counteracting such relative angular displacement, we have additionally provided dash-pot means to be described hereinafter.

One of the three relatively rotatable members 21 and 32, 35 and 36, 37 is provided with two series of cavities filled with a liquid, while another one of the three members carries piston elements with it for alternate engagement with the two series of cavities in response to the relative rotation of the members. When the piston elements enter the cavities, they will displace the liquid enclosed therein, thus producing a dash-pot effect which is negligible as long as the relative rotary displacement of the driven members has a low speed, such as occurs in an automobile driven in a curve, but becomes powerful so as to effectively block the relative rotation of the driven shafts 32 and 36 when the speed of such rotation exceeds normal limits as will occur in an automobile when one of the driven wheels slips on ice or snow and starts spinning.

In the embodiment illustrated in Fig. 1 it is the driven member 32, 35 which is provided with the cavities filled with a liquid, whereas the driving member 21 is the one which carries the piston elements. Shaft 32 is formed with an integral flange 44 adjacent the bearing 33 having a plane end face 45 disposed in opposed parallel relationship to the end face 46 of the annular disk 35. Supporting means formed by an annular member 47 are disposed between the faces 45 and 46 in contact therewith and is mounted for common rotation with the driving member 21 owing to the engagement of internal teeth of the cup-shaped element 23 with external teeth of the supporting member 47. This member is provided with an annular series of cylindrical bores 48, each bore accommodating a piston element which, in the embodiment shown, is formed by a ball 49. Each of the faces 45 and 46 is provided with a series of cavities 50, or 51 respectively, which have an arcuate radial sectional profile, whereas their circumferential sectional profile is formed by arcs of a larger radius than that of the balls 49, as will appear from Fig. 2. The axial width of the supporting member 47 is about two thirds of the diameter of the balls 49.

Each of the cavities 50 and 51 is sealed by the plane side walls of the interposed supporting member 47 except for the bores 48 which establish a communication between the opposed cavities 50 and 51, such communication, however, being restricted by the balls 49 which are fitted in the bores 48 with a very small clearance. The recesses 50 are circumferentially displaced with respect to the recesses 51 so that a ball 49 engaging a recess 50 in the center thereof will be seated on the plane side face 46 of the annular disk 35, whereas a ball 49 entering a cavity 51 in the center thereof will be seated upon the plane side face 45 of the flange 44. Preferably, the number of the bores 48 and the balls 49 accommodated thereby is so chosen with respect to the numbers of the cavities or recesses 50, 51 that some of the balls will enter the recesses 50 while other balls enter the recesses 51.

Any relative rotation between the differential transmission member 21, 22, 23 and the differential transmission member 32, 35, 44 causes the supporting member 47 to be turned between the two opposed faces 45 and 46 and the cavities 50 and 51 provided therein causing each ball 49 to alternately engage the cavities 50 and 51 and to forcibly displace the liquid, such as oil, contained therein through the clearance between the walls of bore 48 and the ball 49. This causes a dash-pot effect which progresses as the relative speed of the differential transmission members increases.

Figure 2:
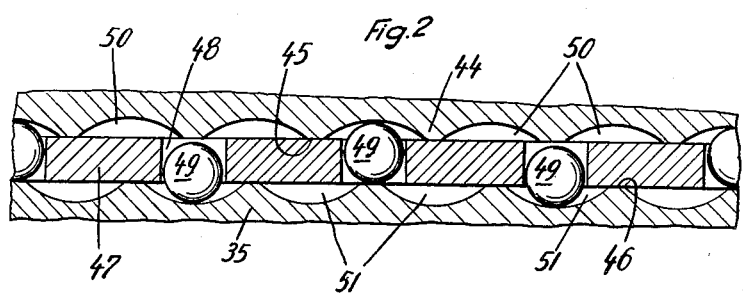
Fig. 2 is a development of a cylindrical sectional plane indicated in Fig. 1 by the dashdotted line marked by the arrows 2—2.

Preferably, the circumferential sectional profiles of the cavities 50, 51, as shown in Fig. 2, are so chosen as to constitute substantially equidistant curves accommodating the balls 49 between them with a minimum of clearance. The circumferential face of flange 44 is slightly conical and, under the pressure exerted by the followers 42 upon the cam faces 40 may engage an internal conical friction face 53 provided on the cup-shaped element 23 of the driving member.

From the foregoing it will appear that the operation of our improved differential transmission is as follows:

Under normal conditions of operation when the driven shafts 32 and 36 are subjected to more or less equal loads, the friction occurring between the followers 42, the side walls of the recesses 43 and the cam faces 40 and 41 reinforced by the friction between the flange 44 and the friction face 53 will tend to lock the driven members of the differential transmisson against relative rotary displacement so that the shafts 32 and 36 are driven at equal rotary velocities. The friction, however, will be overcome when the difference between the loads imposed on the driven shafts 32 and 36 exceeds a certain limit. In that event, one of the undulated cam faces, 40, 41 will displace the spherical followers 42 in the grooves or recesses 43 causing the followers to act on the opposite undulated cam face to thereby produce a relative rotation of the annular disks 35 and 37. As soon as the speed of this angular displacement exceeds a certain limit, as may happen in an automobile, for instance, when one of the wheels is slipping, a relative rotation occurs between the supporting member 47 and the opposed faces 45 and 46. As a result, the balls 49 will be reciprocated in the bores 48 of the supporting member to alternately engage the cavities 50 of the one series and the cavities 51 of the other series displacing the liquid from the cavities and forcing it to flow into the opposite cavities through the restricted clearance spaces in the bores 48. Consequently, a dash-pot effect is produced which counteracts the relative rotation of the differential transmission members. By suitably selecting the clearance of the balls 49 in the bores 48 and the clearance between the side faces 45 and 46 and the supporting member 47 the dash-pot effect may be so chosen as to become effective at any desired relative rotation of the differential transmission members.

The faces 45 and 46 constitute coaxially disposed spaced surfaces of revolution, each of which is provided with an annular series of recesses 50, or 51 respectively. These surfaces 45 and 46 of revolution need not be necessarily plane so as to extend perpendicularly to the axis 20—20.

Preferably the number of the recesses 50, or 51 respectively, differs from the number of the piston members 49.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Differential transmission comprising a pair of driven members each provided with an undulated cam face, a plurality of followers, a driving member forming a cage for said followers maintaining same in position for cooperation with said cam faces, means for mounting all of said members for relative rotation about a common axis, at least one of said driven members being provided with two series of cavities filled with a liquid, a supporting means operatively connected with said driving member including piston elements movably mounted in said supporting means between said series of cavities for alternate engagement therewith in response to said relative rotation between all said members so as to counteract the same.

2. Differential transmission comprising a pair of driven members each provided with an undulated cam face, a plurality of followers, a driving member forming a cage for said followers maintaining same in position for cooperation with said cam faces, means for mounting all of said members for relative rotation about a common axis, at least one of said driven members being provided with two series of cavities filled with a liquid, a supporting member comprising an annular disk interposed between said two series of cavities and mounted on said driving member for common rotation therewith and provided with bores connecting the cavities of one of said series with the cavities of the other one of said series and piston elements movably mounted in said bores and projecting therefrom for alternate engagement with said cavities in response to said relative rotation between all said members so as to counteract the same.

3. Differential transmission comprising a pair of driven members each provided with an undulated cam face, a plurality of followers, a driving member forming a cage for said followers maintaining same in position for cooperation with said cam faces, means for mounting all of said members for relative rotation about a common axis, one of said driven members being provided with a pair of opposed faces surrounding said axis, each face being provided with an annular series of cavities filled with a liquid, supporting means mounted for common rotation with said driving member and disposed between said faces, and piston elements movably mounted on said supporting means between said series of cavities for alternate engagement therewith in response to said relative rotation between all said members so as to counteract the same.

4. In a differential transmission, the combination comprising one driving member and a pair of driven members, means for mounting all of said members for relative rotation about a common axis, one of said driven members being provided with a pair of opposed faces surrounding said axis, each of said faces being provided with an annular series of cavities filled with oil, the cavities of one of said series being circumferentially displaced relative to the cavities of the other one of said series, a supporting member mounted for common rotation with said driving member and disposed between said faces, an annular series of bores in said supporting member in registry with said series of cavities, and piston elements slidingly mounted in said bores and projecting from said supporting member for alternate engagement with said series of cavities in response to said relative rotation between all said members so as to counteract the same.

5. The combination claimed in claim 4 in which said piston elements are formed by balls.

6. In a differential transmission the combination comprising a pair of driven members, a driving member, means for mounting all of said members for relative rotation about a common axis, one of said driven members being provided with a pair of coaxially disposed spaced surfaces of revolution, each of said surfaces being provided with an annular series of recesses, the recesses of one of said series being circumferentially displaced relative to the recesses of the other one of said series, a supporting element mounted for common rotation with driving member and disposed between said surfaces for covering said recesses and provided with an annular series of bores connecting the recesses of one of said series with the recesses of the other one of said series, piston members in said bores projecting therefrom for alternate engagement with the recesses of said series in response to said relative rotation, said recesses being filled with a liquid causing said pistons to counteract said relative rotation.

7. In a differential transmission the combination comprising a driving member, a pair of driven members, means for mounting all of said members for relative rotation about a common axis, and dash-pot means for counteracting said relative rotation, said dash-pot means comprising an annular series of piston elements, a supporting element mounted for common rotation with said driving member and movably accommodating said piston elements, one of said driven members being provided with a pair of coaxially disposed, spaced, opposed surfaces of revolution formed with registering annular series of recesses, the recesses in one of said surfaces being circumferentially displaced with respect to the recesses in the other one of said surfaces, said supporting element being disposed between said surfaces with said piston elements projecting therefrom for alternate engagement with said recesses and a liquid filling said recesses.

8. The combination claimed in claim 7 in which said surfaces of revolution are plane faces extending perpendicularly to said axis.

9. Differential transmission comprising a pair of driven members, each provided with an undulated cam face, a plurality of followers, a driving member forming a cage for said followers maintaining same in position for cooperation with said cam faces, means for mounting all of said members for relative rotation about a common axis, one of said driven members being provided with a pair of coaxially disposed, spaced, opposed faces, each face of being provided with an annular series of recesses filled with a liquid, a supporting element mounted for common rotation with said driving member and disposed between said faces and provided with an annular series of bores connecting the recesses of one of said series with the recesses of the other one of said series, and piston members in said bores projecting from said supporting element for alternate engagement with the recesses of said series in response to said relative rotation between all said members so as to counteract the same.

10. Differential transmittion as claimed in claim 9 in which the number of said recesses in each of said series differs from the number of said piston members.

11. Differential transmission comprising a pair of driven members each provided with an undulated cam face, a plurality of followers, an essentially hollow driving member surrounding said driven members and forming a cage for said followers maintaining the same in position for cooperation with said cam faces, means for mounting all of said members for relative rotation about a common axis, at least one of said driven members being provided with two series of cavities filled with a liquid, and supporting means operatively connected with said driving member including piston elements movably mounted in said supporting means between said series of cavities for alternate engagement therewith in response to said relative rotation between all said members so as to counteract the same.

12. In a differential transmission, the combination comprising one essentially hollow driving member and a pair of driven members disposed within said hollow driving member, means for mounting all of said members for relative rotation about a common axis, one of said driven members being provided with a pair of opposed faces surrounding said axis, each of said faces being provided with an annular series of cavities filled with oil, the cavities of one of said series being circumferentially displaced relative to the cavities of the other one of said series, a supporting member mounted for common rotation with said driving member and disposed between said faces, an annular series of bores in said supporting member in registry with said series of cavities, and piston elements slidingly mounted in said bores and projecting from said supporting member for alternate engagement with said series of cavities in response to said relative rotation between all said members so as to counteract the same.

13. A differential transmission comprising a housing, a pair of driven members, a driving member, means rotatably supporting said driving and driven members in said housing, and means operatively connecting said driving member with said driven members including mechanical frictional torque transmitting means normally frictionally connecting said driving member with both said driven members and enabling relative movement between said driven members only upon the occurrence of a difference of loads on said driven members in excess of a predetermined amount, and dash-pot type hydraulic locking means operatively connected between two of said members and becoming operative only with said two members exceeding a predetermined rotational speed to assist said mechanical means in the transmission of torque.

14. A differential transmission comprising a housing, a pair of driven members, a driving member, means rotatably supporting said driving and driven members in said housing, and means operatively connecting said driving member with said driven members including mechanical fricitional torque transmitting means normally lockingly connecting said driving member with both said driven members and enabling relative movement between said driven members only upon the occurrence of a difference of loads on said driven members in excess of a predetermined amount, and hydraulic locking means operatively connected between two of said members and becoming operative only with said two members exceeding a predetermined rotational speed to assist said mechanical means in the transmission of torque, said hydraulic locking means including means constituting a double-acting dash-pot structure effective in either direction of relative rotation between said two members.

15. A differential transmission comprising a housing, a pair of driven members, a driving member, means rotatably supporting said driving and driven members in said housing, and means operatively connecting said driving member with said driven members including mechanical frictional torque transmitting means normally lockingly connecting said driving member with both said driven members and enabling relative movement between said driven members only upon the occurrence of a difference of loads on said driven members in excess of a predetermined amount, and hydraulic locking means operatively connected between two of said members and becoming operative only with said two members exceeding a predetermined rotational speed to assist said mechanical means in the transmission of torque, said hydraulic locking means including throttling means throttling the flow of the hydraulic medium and constituting a double-acting dash-pot effective in either direction of relative rotation between said two members with said two members exceeding said predetermined relative speed.

16. A self-locking differential transmission comprising a housing, a pair of driven members, a driving member, means rotatably supporting said driving and driven members in said housing, and means operatively connecting said driving member with said driven members including mechanical torque transmitting means having cam surface means and follower means in operative engagement with said cam surface means normally self-lockingly connecting said driving member with both said driven members and enabling relative movement between said driven members only upon the occurrence of a difference of loads on said driven members in excess of a predetermined amount, and hydraulic locking means forming a double-acting dash-pot effective in either direction of relative rotation and operatively connected between two of said members to become operative only with said two members exceeding a predetermined rotational speed to assist said mechanical torque transmitting means in the transmission of torque, said hydraulic locking means including means constituting fluid chambers in each of said two members containing a hydraulic medium and interconnected by communicating passages, and throttling means in said passages and effectively throttling the flow of said medium between said chambers with said two members exceeding said predetermined speed to thereby effectively assist said mechanical means in the transmission of torque.

References Cited in the file of this patent

UNITED STATES PATENTS

| | | |
|---|---|---|
| 1,692,531 | Abramson | Nov. 20, 1928 |
| 2,206,907 | Loughridge | July 9, 1940 |
| 2,207,310 | Ballamy | July 9, 1940 |
| 2,395,355 | Thompson | Feb. 19, 1946 |
| 2,397,374 | Schlicksupp | Mar. 26, 1946 |
| 2,778,245 | Thornton | Jan. 22, 1957 |

FOREIGN PATENTS

| | | |
|---|---|---|
| 852,208 | Germany | Oct. 13, 1952 |